(12) United States Patent
ErkenBrack

(10) Patent No.: US 6,581,253 B2
(45) Date of Patent: Jun. 24, 2003

(54) FLUID-TIGHT CONTAINER SEAL

(76) Inventor: Kenneth Beresford ErkenBrack, 3420 Moubry La., Charlottesville, VA (US) 22911

( * ) Notice: Subject to any disclaimer, the term of this patent is extended or adjusted under 35 U.S.C. 154(b) by 0 days.

(21) Appl. No.: 10/150,447

(22) Filed: May 17, 2002

(65) Prior Publication Data

US 2003/0051318 A1 Mar. 20, 2003

Related U.S. Application Data

(60) Provisional application No. 60/322,059, filed on Sep. 14, 2001.

(51) Int. Cl.[7] .......................... A44B 19/16; B65D 33/16
(52) U.S. Cl. .............................. 24/428; 24/399; 24/400; 24/427; 24/585.1; 383/63; 383/64
(58) Field of Search ........................ 24/428, 427, 400, 24/399, 585.1, 585.12; 383/63, 64, 65

(56) References Cited

U.S. PATENT DOCUMENTS

| | | | | |
|---|---|---|---|---|
| 3,806,998 A | * | 4/1974 | Laguerre | 24/428 |
| 4,863,286 A | * | 9/1989 | Branson | 383/63 |
| 4,878,763 A | * | 11/1989 | Ausnit | 383/63 |
| 5,007,143 A | * | 4/1991 | Herrington | 24/400 |
| 5,010,627 A | * | 4/1991 | Herrington et al. | 24/399 |
| 5,017,021 A | * | 5/1991 | Simonsen et al. | 383/63 |
| 5,950,285 A | * | 9/1999 | Porchia et al. | 24/400 |
| 6,033,113 A | * | 3/2000 | Anderson | 24/585.1 |
| 6,047,450 A | * | 4/2000 | Machacek et al. | 24/399 |
| 6,491,432 B2 | * | 12/2002 | May | 383/64 |

* cited by examiner

Primary Examiner—Victor Sakran
(74) Attorney, Agent, or Firm—Keith F. Goodenough

(57) ABSTRACT

A reusable bi-directional, fluid-tight, vertical sealing device for closing, sealing, and permitting re-opening of, flexible bags, with two sealing strips arranged to be interlocked and uninterlocked by a slider which has internal means such as rails acting upon the sealing strips so as to move them into a vertically interlocked fluid-tight sealing contact capable of holding a vacuum without leakage and of resisting pressure differences in either direction across the seal, so that the efficacy of the seal is improved by increases in the pressure differential. The word "fluid", is used in its usual meaning of liquid or gas or a mixture of both, and, in addition, powder, and "vertical", herein means in the plane of interior contact of the sheets of the bag when empty and hanging vertically.

21 Claims, 4 Drawing Sheets

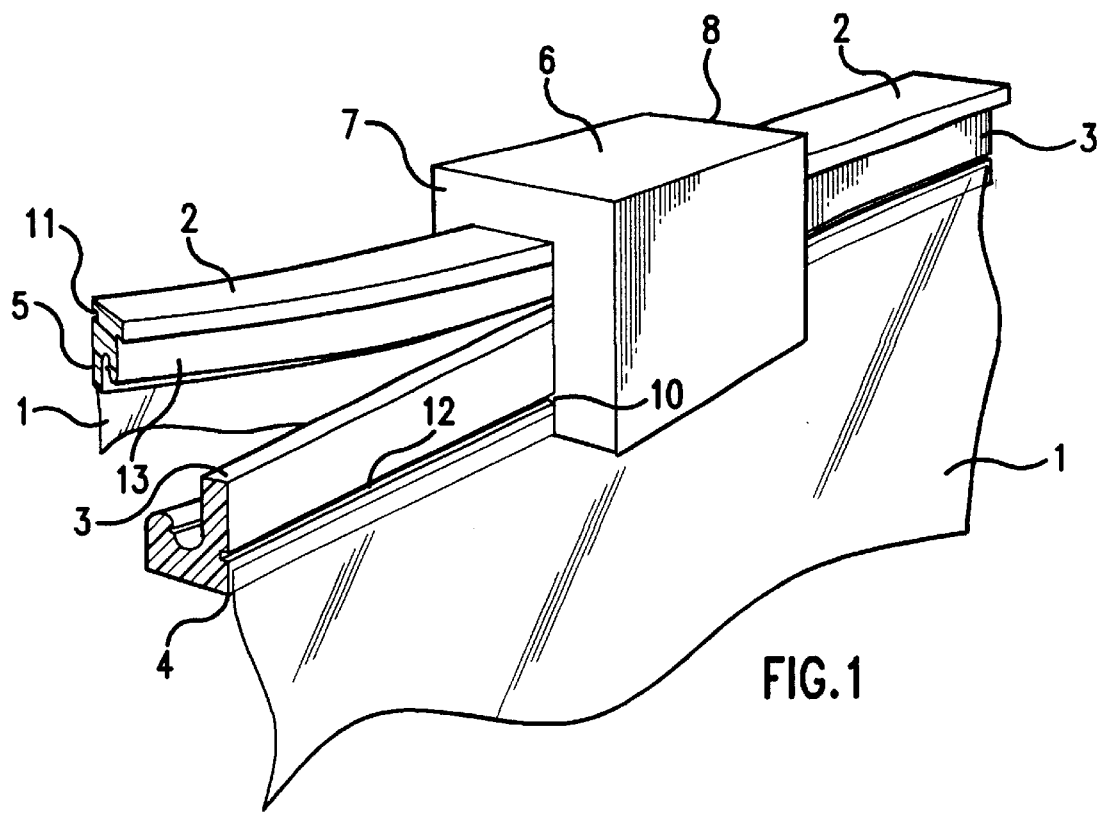
FIG.1
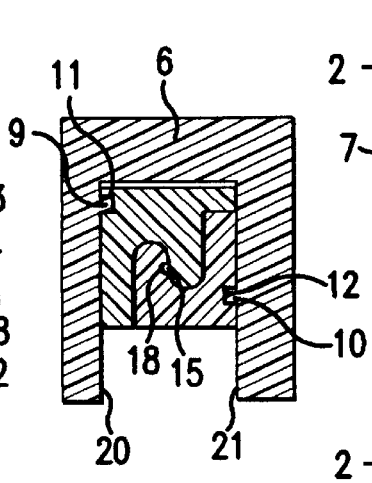 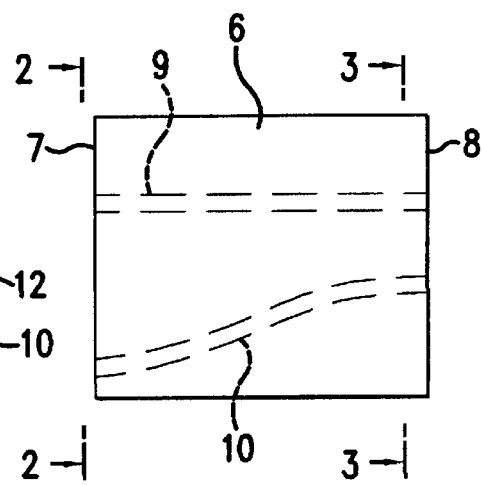
FIG.2  FIG.3  FIG.4

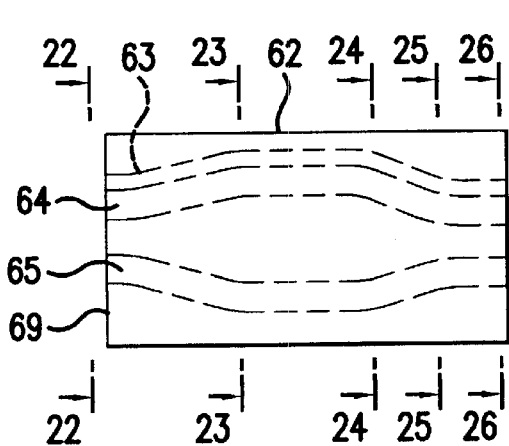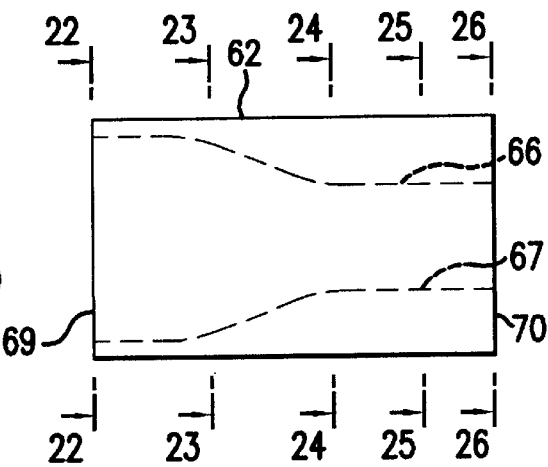
FIG.20    FIG.21
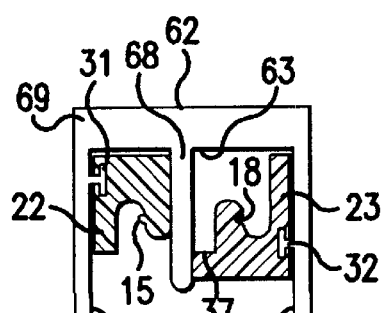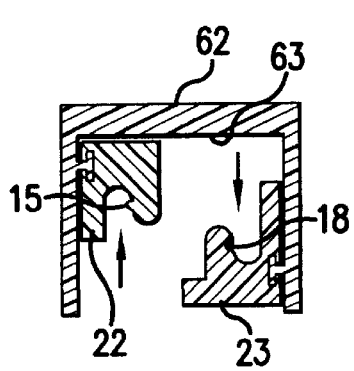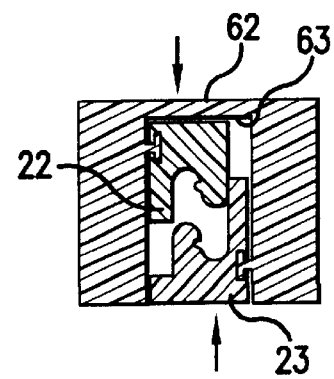
FIG.22    FIG.23    FIG.24
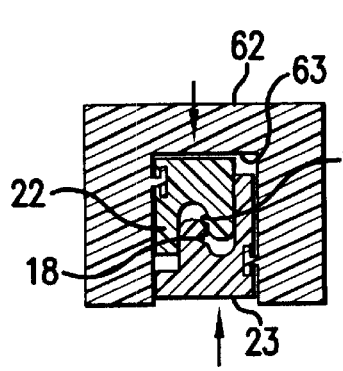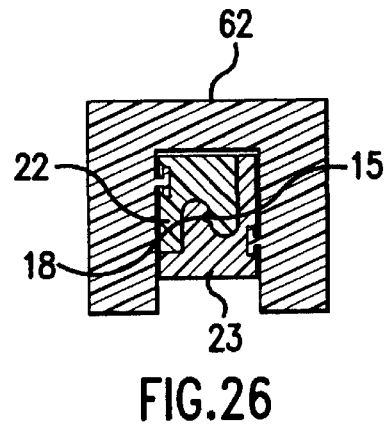
FIG.25    FIG.26

FLUID-TIGHT CONTAINER SEAL

CROSS REFERENCE TO RELATED APPLICATIONS

This application is related to provisional application No. 60/322,059 filed on Sep. 14, 2001.

STATEMENT REGARDING FEDERALLY SPONSORED RESEARCH OR DEVELOPMENT

Not applicable.

REFERENCE TO A SEQUENCE LISTING

Not applicable.

BACKGROUND OF THE INVENTION

The keeping of matter in sealed containers is widely practiced. As a well-known and very prevalent example, food is kept in sealed bags, both commercially and by members of the public, to preserve its freshness and to protect from contamination. The production of sealable plastic bags is carried on by several large companies, and there have been many U.S. patents granted for sealing closure strips, for example, U.S. Pat. Nos. 3,416,199, 4,186,786, 4,212,337, 4,285,105, 4,362,198, 4,363,345, 4,578,813, 4,791,710, 4,829,641, 4,863,286, 4,878,763, 5,007,143, 5,010,627, 5,017,021, 6,033,113, and 6,185,813. The author of the present invention holds U.S. Pat. No. 5,142,970 relating to the extraction of gas from conventionally sealed bags, in order to achieve what is commonly known as "vacuum packing", which means in most, if not all, cases partial vacuum packing. In vacuum packing a pressure difference is created between the higher pressure outside the bag and the lower pressure inside the bag, but a pressure difference in the opposite direction may occur if the bag is overloaded or shaken to release trapped or dissolved gas as in the case of soda water, for example, or if the bag is used in applications in outer space, as another example. The seals for flexible plastic bags available hitherto have consisted of two strips, one along each side of the bag opening, capable of being squeezed together either manually or by an slider operating over both strips along their lengths. One of the strips has an undercut groove or series of grooves into which snaps, when the strips are pressed together, a corresponding male element or series of such elements molded onto the other strip, to give a notional seal along the now closed bag access end. For instance, in conventional bag seals, the first strip may have a groove undercut, molded or extruded with the cross-sectional profile of a mushroom-shaped space, while the other strip has a protrusion of a similarly-shaped profile. The weakness of this conventional design is that in order to enable the sealing strips to be capable of being snapped together, there must be a tiny clearance space between the female and male strip elements, which means that the notional seal formed thereby is never entirely leak-proof. In addition, because these conventional strips are squeezed together in respective directions at right angles to the bag walls in order to effect the notional seal, they tend to be separated by an excess of pressure inside the bag over the pressure outside the bag, again tending to cause leakage. The conventional "sealing" strips available hitherto could more accurately be termed "closure" strips, because their sealing abilities are nominal at best. In the course of research by the present inventor it was discovered that none of the press or slide sealing closure strips available at prices economical for the retail public, were satisfactorily fluid-tight, the word "fluid" being used throughout herein in its usual meaning of liquid or gas or a mixture of both, and, in addition, powder. Pressure differences in either direction across the available sealing strips tended to force them apart and promote leakage, so that the only remedy for adequately vacuum-packed substances such as food intended to be stored for extended periods was in heat-sealing the bags. Heat-sealing of course involves melting the opposing sides of the bag together, so that the bag must be cut open to access its contents. The desirable feature of being able to reseal, and exhaust residual air from, the bag after extracting part of the contents was therefore not available on the consumer-oriented market, and it is one of the subsidiary benefits of the present invention that vacuum packed bags can be partially unloaded and then safely re-used. It was the necessity of obtaining a cheap fluid-tight seal for further developments in adequate vacuum packing that led to the present invention, which is a slide-operated sealing strip combination capable of low-cost production and so designed as to provide a sealing effect that increases the greater the pressure difference across it, that is, the reverse of the undesired leakage tendency that is evident in the strip seals available hitherto. Instead of the space between the conventional sealing elements, the present invention features extensive sealing surfaces that press more tightly together as the pressure differential in either direction increases, and the sealing effect, instead of being at right-angles to the bag walls as in the conventional seals available hitherto, is in the plane of internal contact of the sheets of the bag when empty and hanging vertically from the sealing strips, that is, at right angles to the direction of conventional seals. This increased sealing effect characteristic of the present invention effectively renders this invention the only reusable sealing device possible for use with vacuum packing in flexible bags.

RELATED APPLICATIONS

A slide-operated sealing strip combination was disclosed in the present inventor's provisional Patent Application No. 60/322,059 filed on Sep. 14, 2001. That disclosure was supplemented by the present inventor's filing on Dec. 27, 2001 of Disclosure Document No. 502505.

BRIEF SUMMARY OF THE INVENTION

This invention is a flexible container seal which may be opened and closed by the operation of a slider on two sealing strips of complementary profiles, and provides a sealing effect which tends to become more resistant to leakage the greater the pressure difference is across the seal. The invention is particularly applicable to the fluid-tight sealing of conventional flexible plastic bags that are commonly made of two rectangular flexible plastic sheets of the same size joined together by heat or other means along three corresponding sides, leaving the fourth side open to provide access to the bag interior. The edges of the fourth side lie together when the bag is empty. Alternatively, to form a bag, a single rectangular plastic sheet may be folded in half and two of the remaining sides are then joined together, also leaving an open side of the same form.

This invention comprises two complementary sealing strips, attached by conventional means to, or molded with, the edges of the bag opening, one sealing strip along each of the two edges, which in bags in common use are conventionally straight, of the bag opening. The bag opening edges may be curved, and in that case the sealing strips are likewise curved, but that case, in the absence of special uses requiring such configuration, would be rare. The sealing strips have transverse cross-sectional profiles which are essentially in thickened short-shank hook form, one having a male ridge with a curved profile along its length, and the other having a female channel to fit the male ridge.

The ridge and channel are so positioned on the respective hook-shaped profiles of the sealing strips that the male ridge snap-fits into the female channel when the sealing strips reach their closed position, in order to hold the sealing strips in that closed position. The presence of the ridge and channel leads to their respective sealing strips being termed male and female herein.

However, in this invention, when the bag is open and in an upright position, the male and female profiles are not, contrary to the conventional design, so disposed that they can be pushed together horizontally, that is, in respective directions at right-angles to the bag walls, to form an interlocking seal. In conventional bag seals the sealing strips are pushed together horizontally, either manually or by operation of a slider, in order to form a seal which has a tendency not to be leak-proof, because a pressure difference in either direction across the interlocking portions of strips will tend to pull or push them apart, and there is a clearance space left between the two horizontally interlocking elements to enable the interlocking to take place. In the present invention, by contrast, the male and female profiles, again when the bag is considered to be in a vertical position, are so shaped and disposed in the strips that they must be moved in a vertical direction towards each other before interlocking can take place between them. In certain embodiments of this invention there must take place for the purpose of interlocking both vertical and horizontal movement, and in certain other embodiments a rotational movement also. The reason for this novel vertical movement of the novel strip profiles of this invention will be apparent from the drawings and Detailed Description herein, but the result is that interlocking along the lengths of the sealing strips, that is, along the bag opening, would be difficult to achieve manually. For that reason, a slider of an inverted U-type shape is provided in this invention, straddling the top and side exterior surfaces of the sealing strips and so arranged as to be slid manually along them. The interior of the slider is so arranged in each embodiment of this invention that the slider, as it is slid along the strips in the bag-open to the bag-closed position, guides the strips into the necessary vertical and other movements described as necessary for interlocking the strip profiles in a vertical fluid-tight position, with the bag closed. As will be seen in the drawings of the present invention, the crosssectional profiles of the novel sealing strips are so arranged that when in their interlocked positions absolute contact is maintained, without surface penetration which would require clearance spaces to fit, between extensive surfaces of the strips, precluding leakage tendencies. Sliding the slider in the reverse position reverses the profile movements and opens the strip and the attached bag. The vertical disposition of the interlocked strip profiles, that is, when the bag is closed, means that a difference in pressure between the interior and the exterior of the bag will press the profiles together, tending to form a more leak-proof seal, contrary to the conventional, horizontal seals available hitherto.

BRIEF DESCRIPTION OF THE DRAWINGS

FIG. 1 is a perspective view of a version of a pair of interlockable flexible sealing strips according to this invention each attached to a respective opening edge of a flexible bag and of a slider moved on the sealing strips into a position where the slider is seen to have already closed together the sealing strips to the right into sealing contact and to be about to close the sealing strips to the left.

FIG. 2 is a transverse cross-section of the sealing strips of FIG. 1 taken immediately to the left of the position in FIG. 1 of the slider, and showing that end of the slider.

FIG. 3 is a transverse cross-section of the sealing strips and the slider of FIG. 1 taken immediately to the left of the right-hand end of the slider as shown in FIG. 1. This view shows the applicable parts of the sealing strips in sealing contact.

FIG. 4 is an external elevation of the slider of FIG. 1, viewed from the right of FIG. 1, and showing as broken lines the internal rails of the slider used to move the sealing strips into sealing contact. The lines across which FIGS. 2 and 3 are taken are also shown.

FIG. 6 is a plan view of the slider of FIG. 5, showing as broken lines the internal walls of the slider used to move the sealing strips into sealing contact. The lines across which

FIG. 7 is an elevation of the slider of FIG. 5, viewed from the right of FIG. 5, and showing as broken lines the internal rails of the slider used to move the sealing strips into sealing contact. The lines across which

FIG. 8 is a transverse cross-section of the sealing strips of FIG. 5 taken on the line 8–8 of FIGS. 6 and 7, and showing the corresponding end of the slider.

FIG. 9 is a transverse cross-section of the sealing strips and the slider of FIG. 5 taken on the lines 9—9 of FIGS. 6 and 7.

FIG. 10 is a transverse cross-section of the sealing strips and the slider of FIG. 5 taken on the line 10—10 of FIGS. 6 and 7. This view shows the applicable parts of the sealing strips in sealing contact.

FIG. 11 is an external elevation of another version of the slider according to this invention, viewed similarly to FIG. 7, and showing as broken lines the internal rails of the slider and the internal ceiling of the slider, both used to move sealing strips into sealing contact. The lines across which

FIG. 12 is a plan view of the slider of FIG. 11, showing as broken lines the internal walls of the slider used to move sealing strips into sealing contact. The lines across which

FIG. 13 is a transverse cross-section of sealing strips in a version corresponding to the slider of FIG. 11 taken on the line 13—13 of FIGS 11 and 12, and showing the corresponding end of the slider.

FIG. 14 is a transverse cross-section of sealing strips in a version corresponding to the slider of FIG. 11 taken on the line 14—14 of FIGS 11 and 12.

FIG. 15 is a transverse cross-section of sealing strips in a version corresponding to the slider of FIG. 11 taken on the line 15—15 of FIGS 11 and 12.

FIG. 16 is a transverse cross-section of sealing strips in a version corresponding to the slider of FIG. 11 taken on the line 16—16 of FIGS. 11 and 12, and showing whence the enlarged view of the rail and groove in FIG. 17 is taken. This view shows the applicable parts of the sealing strips in sealing contact.

FIG. 20 is an external elevation of another version of the slider according to this invention, viewed similarly to FIG. 7, and showing as broken lines the internal rails of the slider and the internal ceiling of the slider, both used to move sealing strips into sealing contact. The lines across which FIGS. 22–26 are taken are also shown.

FIG. 21 is a plan view of the slider of FIG. 20, showing as broken lines the internal walls of the slider, used to move sealing strips into sealing contact. The lines across which FIGS. 22–26 are taken are also shown.

FIG. 22 is a transverse cross-section of sealing strips in a version corresponding to the slider of FIG. 20 taken on the line 22—22 of FIGS. 20 and 21, and showing the corresponding end of the slider with off-center separator element.

FIG. 23 is a transverse cross-section of sealing strips of FIG. 22 and the slider of FIG. 20, 21 and 22 taken on the line 23—23 of FIGS. 20 and 21.

FIG. 24 is a transverse cross-section of sealing strips of FIG. 22 and the slider of FIGS. 20–22 taken on the line 24—24 of FIGS. 20 and 21.

FIG. 25 is a transverse cross-section of sealing strips of FIG. 22 and the slider of FIGS. 20–22 taken on the line 25—25 of FIGS. 20 and 21.

FIG. 26 is a transverse cross-section of sealing strips of FIG. 22 and the slider of FIGS. 20–22 taken on the line 26—26 of FIGS. 20 and 21. This view shows the applicable parts of the sealing strips in sealing contact.

Figure 5:
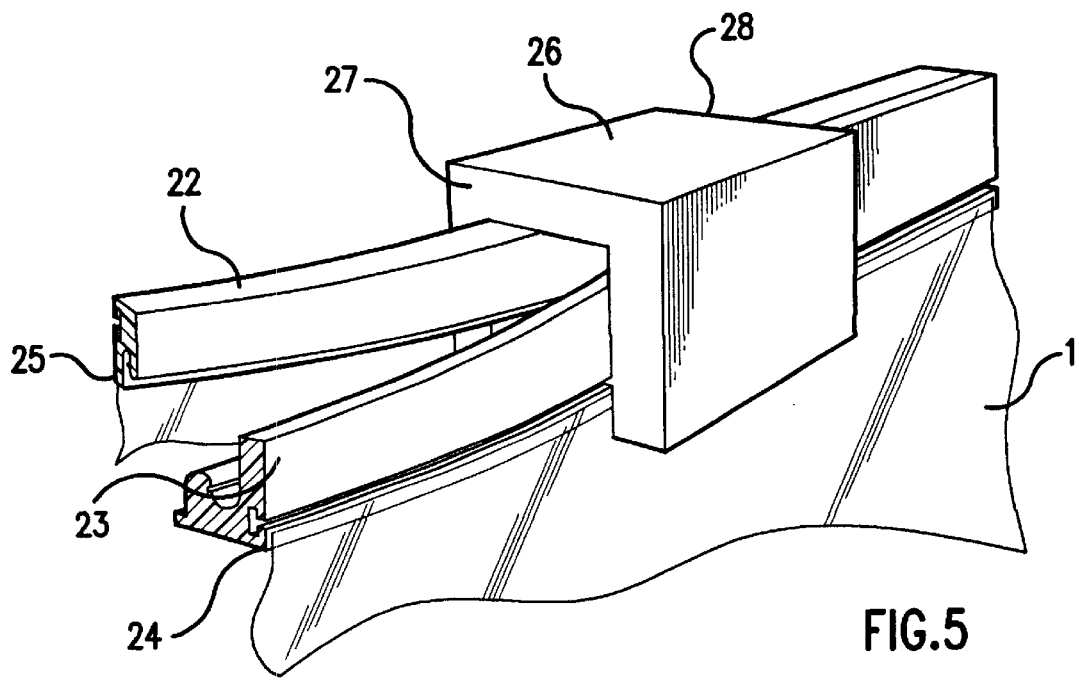
FIG. 5 is a similar view to that of FIG. 1, but showing a different version of the sealing strips and slider according to this invention.

On FIGS. 2, 8, 9, 13, 14, 15, 18, 23, 24, and 25, the unnumbered arrows show the direction of movement of the applicable sealing strip as the slider is moved toward the bag closing and sealing position.

DETAILED DESCRIPTION OF THE INVENTION

This invention relates to a reusable vertical bi-directional fluid-tight sealing device for containers used for storage. The word "fluid" is used throughout herein in its usual meaning of liquid or gas or a mixture of both, and, in addition, powder. Although various different types of container could be fitted with the type of flexible sealed access opening facility to which this invention applies, the most prevalent example of such containers is a type of flexible plastic storage bag which is used principally for the storage of perishable items, such as food. This invention is therefore illustrated, described and claimed herein with reference to its applicability to that type of storage bag. The seal according to this invention permits fluid-tight storage in vacuum or near-vacuum conditions within such a bag, but may also be used with or without vacuum conditions for a container under external conditions that may include normal atmospheric conditions, underwater conditions to great depths, and even outer space. This versatility of application is because the novel vertical reusable seal of this invention tends to become more fluid-tight as the pressure difference across the seal is increased, in great contrast to reusable bag seals hitherto available. The novel verticality of the seal of this invention is a most important and basic feature relating to its efficacy. The types of reusable seals supplied with sealable bags hitherto firstly are not capable of holding a vacuum because they require clearances in their sealing elements to enable those elements to lock together, and secondly tend to open as the pressure difference across the seals is increased, particularly so when the pressure in the bags is higher than that outside, because their notional sealing effect acts at right angles to the bag sides, whereas the sealing effect of the present invention is in the plane of the bag sides and a pressure difference across the seal of the present invention tends to make the seal tighter. This seal tightening result is also aided by the greater area, compared with other available seals, of the sealing contact surfaces of this invention, which is a separate novel feature of their novel interlocking shapes. The large smoothly finished sealing contact surfaces and interlocking shape of this invention are not found, singly or in combination, in any other type of bag seal.

The following description refers for an example of the invention's utility principally to the use of the invention on flexible plastic bags of the type used for food storage. Such bags are essentially made of two identical sheets of flexible material, or possibly one sheet folded in half, joined in fluid-tight fashion together along their perimeters, except for a section of said perimeters left unjoined, said section of perimeter commonly being straight, and forming an opening allowing access to the bag's interior space. For consistency of description throughout, the bag to which the invention is applied is to assumed to be empty, flat, and vertical with its access opening, which the invention is to close, seal and reopen as required, at the top. Manual and slider operated seals available hitherto have relied for closing and notionally sealing such a bag on pressure to interlock male and female cross-sectional profiles in a direction at right angles to the plane of the bag, that is, horizontally in the bag position assumed here. As noted above, such a seal clearly tends to be pulled open by any net excess of pressure inside the bag over that outside, and has clearance spaces which enable the male and female profiles easily to interlock, but which are inherently prone to leakage. By contrast, the two interlocking thickened short-shank hook-shaped elements of the present invention, each molded along the full length of a sealing strip attached to each side of the bag opening, one sealing strip for each side, are moved into interlocked fluid-tight sealing position in a relative direction in the plane of the bag, that is, in a final vertical direction, and, when interlocked, have extensive smoothly finished sealing contact surfaces fully in contact, that is, without leak-prone clearance spaces. These two interlocking thickened short-shank hook-shaped elements are, for example shown in the transverse cross-sections of sealing strips 2 and 3 in vertical interlocked position in FIG. 3. Thus the seal of this invention is referred to herein as a "vertical" seal, and the type of seal available hitherto is referred to as a "horizontal" seal. Although some horizontal movement is necessary in certain embodiments of this invention before the sealing contact surfaces are vertically interlocked, such horizontal movement is only preparatory to the final vertical interlocking movement. The fluid-tight seal of this invention acts vertically in every embodiment, with the result that pressure differences between the interior and exterior of a bag sealed according to this invention tend to force its extensive sealing surfaces more closely together thus tending to make the seal yet more fluid-tight, in essential contrast to the seals available hitherto.

In FIG. 1, which shows one preferred embodiment of this invention, 1 is a flexible bag to be sealed. Such a bag may be made of various types of sheet plastic, the most commonly used being polyethylene. The fluid-tight and vacuum-tight seal according to this invention may certainly be economically manufactured and applied to bags made of polyethylene, which, however, is a porous material and so not capable of holding a vacuum over long periods. Where there is a large pressure difference across the seal or a reliable vacuum is required, nylon is often preferred because it can be manufactured without the porosity that would tend to counteract the efficacy of the seal of this invention in maintaining the desired pressure difference between the interior and exterior of the bag. Bag 1 is shown in FIG. 1 as affixed by adhesive or heat-application to sealing strips 2 and 3 at attachment areas 4 and 5 respectively. Sealing strips 2 and 3, which, in common with all sealing strips according to this invention, are extruded or molded each to have a constant respective cross-sectional profile each along its entire length, may be made of any suitable non-porous flexible material with low friction surfaces able to accommodate the sliding action of slider 6 and the mutual sliding action of each sealing strip against the other during the process of their being interlocked into a fluid-tight seal. The bag may also be molded integrally with sealing strips 2 and 3, in which case the bag merges with attachment areas 4 and 5. Slider 6, which is of an inverted U-type shape in common with all sliders according to this invention, is mounted straddling sealing strips 2 and 3, and may be made with rectangular surfaces as shown in this example and of metal or rigid or semi-rigid plastic having low-friction internal surfaces. In FIG. 1, slider 6 is shown in a position where its sliding action to the left has, as illustrated in FIG. 3, already closed sealing strips 2 and 3 into fluid-tight contact to the right of the position of slider 6, while to the left of slider 6 as illustrated in FIG. 2, sealing strips 2 and 3 are still apart. FIGS. 2 and 3 show the two interlocking thickened short-shank hook-shaped elements of the present invention as transverse cross-sections of sealing strips 2 and 3, each molded along the full length of its respective sealing strip. FIG. 3 shows in transverse cross-section sealing strips 2 and 3 in vertical interlocked fluid-tight sealing contact, as also shown for sealing strips 22 and 23 in FIGS. 10, 16 and 26 in other embodiments of this invention described herein.

Alternatively, slider 6 in FIG. 1 could be seen as traveling to the right, having already opened sealing strips 2 and 3 to the left, while to the right they are still in fluid-tight contact.

FIGS. 2–4 illustrate how slider 6 closes sealing strips 2 and 3 into fluid-tight contact. FIG. 2 shows the left hand end 7 of slider 4 framing transverse cross-sections of sealing strips 2 and 3 taken immediately before their entry into slider end 7, as shown by section lines 2—2 of FIG. 4, which is an elevation view of slider 6 showing slider ends 7 and 8. In FIG. 2 the cross-sectional profiles of sealing strips 2 and 3 clearly demonstrate that sealing strips 2 and 3, in the case where bag 1 of FIG. 1 is assumed to be upright, cannot be arranged into the interlocked positions shown in FIG. 3 without a relative vertical movement being applied to them. With sealing strips at the same level, it would not be possible to interlock them together by a horizontal movement relative one to the other. Consequently, as in all embodiments of this invention, the interior of the applicable slider, in this instance slider 6, is arranged to guide the sealing strips vertically into their final interlocked fluid-tight sealing position, shown in this instance in FIG.3, when the bag is to be closed, and to unlock them from their vertical interlocked sealing position, as in FIG. 2, when the slider movement is reversed, so as to open the bag. To effect that relative movement of sealing strips 2 and 3, which have, running axially along their entire lengths, grooves 11 and 12 respectively, in FIGS. 2 and 3, slider 6 is equipped with rails 9 and 10 which run respectively in grooves 11 and 12. Rail 9 runs along vertical wall 20 in a straight line parallel to the axis of slider 6, and rail 10 slopes in modified S-curved fashion from a lower to a higher position on vertical wall 21, said position being determined as that necessary to move sealing strip 3 vertically into vertical interlocked fluid-tight sealing contact with sealing strip 2. As can be seen in FIG. 4 in elevation, rails 9 and 10, although in different, mutually parallel planes appear mutually to converge toward the right hand 8 of slider 6, such convergence impelling sealing strips 2 and 3 vertically together into sealing contact. From FIGS. 2, 3 and 4, it can seen that rail 9, which runs in groove 11 in sealing strip 2, maintains sealing strip 2 at the same level through slider 6, whereas rail 10, running in groove 12 in sealing strip 3, raises sealing strip 3 into the interlocked position with sealing strip 2 shown in FIG. 3. FIG. 1, in addition, shows groove 12 running in an axial direction along sealing strip 3. The described operation of the slider, that is the positive movement of sealing strips 2 and 3 into vertical interlocked fluid-tight sealing contact by means of rails 9 and 10 in slider 6 is a completely novel feature, present in this invention's various embodiments only. In other embodiments of this invention the rails, which may alternatively be located on the sealing strips to work in grooves in the applicable slider, may be assisted by the configuration of the internal walls and ceiling of the slider, but in every embodiment of this invention the slider is used to move the sealing strips into vertical interlocked fluid tight sealing contact, that is, with the term "vertical" being understood as in the plane of internal contact of the sheets of the bag when empty and hanging vertically from the sealing strips, as opposed to the "horizontal" contact of the leak-prone seals available hitherto, which are engaged by force applied perpendicular to that plane. In every embodiment of this invention the sealed bag is opened, that is, unsealed, by sliding the slider along the sealing strips in the reverse direction from that used for sealing.

To illustrate the sealing action of this invention, FIGS. 1–3 show sealing strips 2 and 3 in transverse cross-section. Sealing strip 2 has smoothly finished sealing contact surface 13, which runs in axial direction along the whole of sealing strip 2, and which is the entire area of sealing strip 2 that is shown in cross-section in contact with corresponding contact sealing surface 16 of sealing strip 3 in FIG. 3. Sealing contact surface 13 encloses thickened, short-shanked hook-shaped portion 14, which bears on its interior surface portion ridge 15, including extension 19. In complementary fashion, smoothly finished sealing contact surface 16 encloses thickened, short-shanked hook-shaped portion 17 having channel 18 of a size and location to accommodate with close fit ridge 15 in the interlocked position of sealing strips 2 and 3 shown in FIG. 3. Both ridge 15 and channel 18 run in axial direction along the whole of their respective sealing strips 2 and 3, and, on reaching the interlocked position of FIG. 3, ridge 15 snap-fits into channel 18, thus locating and maintaining sealing strips 2 and 3 in their interlocked sealing positions after passage of slider 6 in the bag sealing direction. When the bag, having been closed, is required to be opened, slider 6 is moved in the opposite direction, slider 6 by the action of its rails 9 and 10 snaps ridge 15 out of channel 18 and uninterlocks sealing strips 2 and 3 into the position shown in FIG. 2.

A particularly important and novel feature of this invention is the strong fluid-tight seal effected by the large area of contact between smoothly finished sealing contact surfaces 13 and 16 as illustrated in FIG. 3. This includes sealing strip 3 butting against the extension 19 of sealing strip 2. Sealing contact surfaces 13 and 16 are smooth, flush and of mutually interlocking profiles, including snap-fit ridge 15 and channel 18, thereby providing unbroken sealing contact along their whole lengths together, in contrast to seals hitherto available, which have leak-prone clearance spaces to enable them to fit together in addition to gaps caused by normal manufacturing inaccuracies. Snap-fit ridge 15 and channel 18, by contrast, are deliberately located near the center of the sealing surfaces 13 and 16 to preclude any tendency to leakage during the snap-fit operation. The sealing contact efficacy of the extensive smoothly finished sealing contact surfaces 13 and 16 apply to all embodiments of the present invention.

Another important and novel feature of this invention is that it provides a fluid tight seal whichever way across the seal the net pressure difference between the interior and exterior of the bag is acting. This is readily explained by reference to FIG. 3, showing sealing strips 2 and 3 in interlocking position, maintained there by ridge 15 in channel 18. Clearly, any net pressure from the interior or exterior of sealing strips 2 and 3 will tend to force them more in contact together. Again considering FIG. 3, the net force tending to force the sealing strips into tighter sealing contact is the difference in pressure, for example in pounds per square inch, multiplied by the area, for example in square inches, of the projection on a horizontal plane of the contact surfaces of sealing contact surfaces 13 and 16. Such net force, in pounds in this example, acts vertically to the horizontal plane, and is vertically up or vertically down, according to whether the net positive pressure is from within or outside the bag respectively. The novel type of seal according to this invention is therefore described throughout herein as a "vertical" seal. Since sealing contact surfaces 13 and 16 are close-fitting over their complete contact areas, no fluid can penetrate the resultant seal to exert the horizontal force that tends to render leak-prone the horizontal seals hitherto available. By contrast to the extensive smoothly finished sealing contact surfaces 13 and 16 of this invention, sealing strips hitherto available do not have close contact over their sealing surfaces, but to the contrary have clearance spaces between their interlocking elements, which in turn act in directions at right angles to the planes of the bag sides with a consequent tendency to be pulled apart by an excess of net pressure from the interior of the bag, whereas in the present invention sealing strips 2 and 3 act in the same general vertical plane as the portions of the bag sides nearest the seal, whether or not the bag has contents.

A variation on the embodiment in FIGS. 1–4, could have sealing strip 3 maintained at the same level with respect to the slider while sealing strip 2 was moved vertically downwards. This would require reversal of the rails shown in FIG. 4, so that the lower rail was straight and parallel to the axis of the slider, while the upper rail would descend from left to right in the reverse of the path of rail 10 shown in FIG. 4. Variations of the embodiment illustrated in FIGS. 1–4 are possible within the scope of this invention, but the end result of all of them is that the slider, when slid in the closing direction, in every case positively moves the sealing strips into vertical interlocked fluid-tight sealing contact. In all variations of all embodiments of this invention, since each sealing strip is moved by positive action, such as that provided by a rail and groove, reversal from the closing direction of the direction of operation of the slider opens the seal, thus rendering the seal reusable.

Other preferred embodiments of this invention are within its scope, and certain of these will be described below, but, as in the embodiment illustrated in FIGS. 1–4, the principal objects of all such embodiments, in common with that already described above, are to provide a bi-directional pressure-resisting fluid-tight reusable bag seal by moving sealing strips having extensive hook-shaped smoothly finished sealing contact surfaces with snap-fit ridge-in-channel components into interlocked sealing contact, and to provide a reverse movement ability in order to unseal the bag. In this invention, in contrast to other seals available hitherto, no elements intended to provide a sealing contact are separated by a clearance space such as those which are necessary in other seals to allow their approximate form of interlocking. In this invention, the extensive smoothly finished sealing contact surfaces, which are a characteristic of the hook-shaped sealing strip profiles, when interlocked, are in full sealing contact. Another feature of this invention is that the leak resistance of its seal increases with increased pressure differences across the seal in either direction, because the sealing contact surfaces of this invention are interlocked in the direction of entering and leaving the bag, that is, in the plane of internal contact of the sheets of the bag when empty and hanging vertically from the sealing strips, defined as the vertical direction herein, so that pressure differences tend to force the sealing contact surfaces together, whereas the reusable bag seals hitherto available have smaller sealing contact surfaces in relation to the size of their sealing strips, interlocking clearance spaces that allow leakage, and a closing movement at right angles to the plane of internal contact of the sheets of the bag when empty and hanging vertically from the sealing strips, defined as being in the horizontal direction herein, which renders them liable to have their sealing strips pulled apart, especially by an excess of internal bag pressure.

Figure 8:
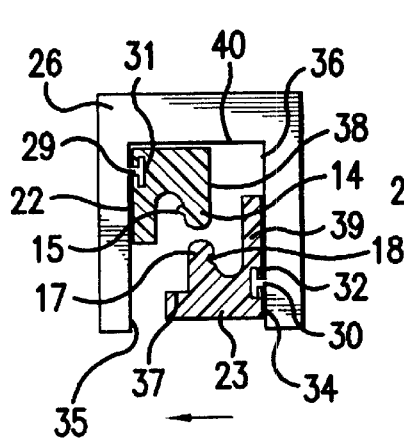
FIGS. 8–10 are taken are also shown.
Figure 9:
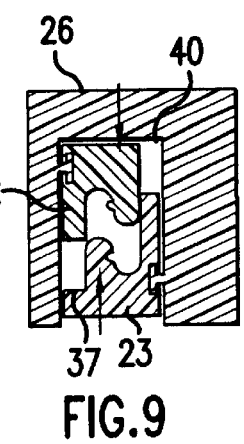
Figure 10:
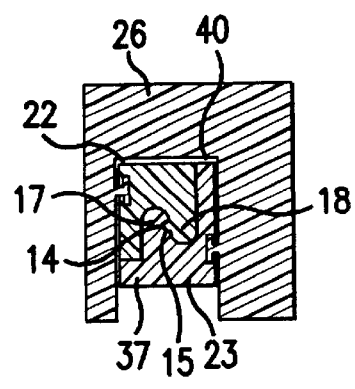

In an additional preferred embodiment of this invention FIG. 5 shows bag 1 having sealing strips 22 and 23, with bag attachment areas 24 and 25, and slider 26 in a position where the sealing strips to the right of FIG. 5 have been closed by slider 26, and, if slider 26 is slid to the left, the sealing strips are about to be closed into fluid-tight contact. The transverse cross-sections of FIGS. 8–10 show the two interlocking thickened short-shank hook-shaped sealing contact elements of the present invention as transverse cross-sections of sealing strips 22 and 23, each molded along the full length of its respective sealing strip.

Figure 6:
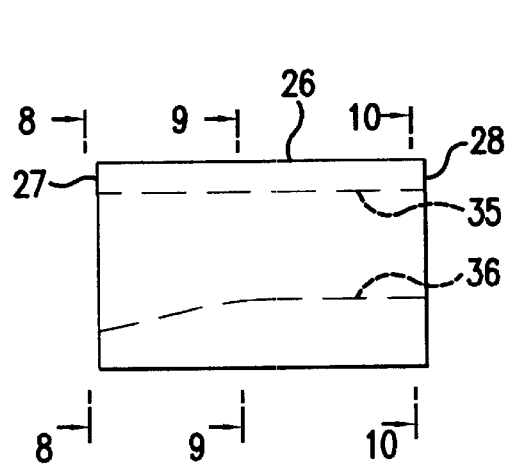
Figure 7:
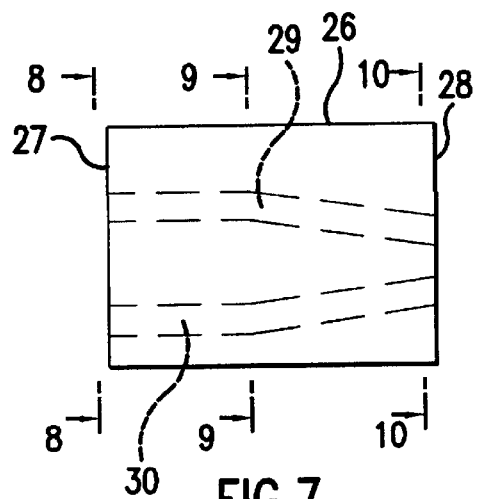

This and subsequent embodiments are shown as using T-shaped rails running in grooves of like shape, in order to obtain greater location stability than would be provided by the plain rails shown for the embodiment illustrated in FIGS. 1–4. In the embodiment of FIGS. 5–10, sealing strips 22 and 23, before being brought into fluid-tight contact by the action of slider 26, are apart horizontally as well as vertically, as shown in FIG. 8, for example, for convenience of access to the bag opening. The action of slider 26 in being slid in the sealing direction, that is, to the left in FIG. 5, is therefore first to move sealing strip 23 horizontally under sealing strip 22, and then move sealing strip 22 down vertically and sealing strip 23 up vertically into fluid-tight sealing contact so that ridge 15 snap-fits into channel 18. This combined movement is achieved by the internal configuration of slider 26 as shown in FIGS. 6 and 7. FIG. 6 is a plan view of slider 26, the broken lines representing internal vertical wall surfaces 35 and 36. FIG. 7 is an elevation view of slider 26, the left hand side of FIG. 7 representing the end of slider 26 visible in FIG. 5, and the broken lines representing T-shaped rails 29 and 30 on interior planar wall 35 and interior wall 36 respectively of slider 26, shown in end view in FIG. 8 and in section in FIGS. 9 and 10. Rails 29 and 30 begin running from the left hand end 27 of slider 26 in apparent parallel fashion as seen in elevation view, and converge in level towards right hand end 28, the respective levels of the rails being calculated to bring sealing strips 22 and 23 into sealing contact. As can be seen in FIGS. 7, 9 and 10, internal ceiling 40 of slider 26 slopes downward parallel to rail 29 to the right hand end of slider 26 to assist rail 29 in moving sealing strip 22 downwards so that ridge 15 snap-fits into channel 18, and fluid-tight sealing contact is achieved. Referring to FIGS. 5, 6, 8 and 9, as slider 26 slides to the left, the seal-closing direction in FIG.5, wall 36 pushes sealing strip 23 horizontally until in FIG. 9 the cross-sectional profile of sealing strip 23 is vertically under the cross-sectional profile of sealing strip 22. Referring to FIGS. 7 and 9, further movement of slider 26 to the left causes rail 29, acting within groove 31 to move sealing strip 22 vertically downwards and simultaneously causes rail 30, acting within groove 32 to move sealing strip 23 vertically upwards until, as shown in FIG. 10, sealing strips 22 and 23 are held in fluid-tight sealing contact by ridge 15 snap-fitting into channel 18. In this embodiment, sealing strips 22 and 23 in FIGS. 8, 9 and 10, have differently configured, though similar, smoothly finished sealing contact surfaces 38 and 39 respectively, with 39 including that of extension 37, compared with the sealing surfaces 13 and 16 respectively, with 13 having extension 19, of sealing strips 2 and 3 in FIGS. 2 and 3. As can be understood from FIG. 10, as from FIG. 3, net pressure forces from inside or outside the bag, that is, in the upward or downward directions, or side to side, horizontally across the sealing strips tend only to press the sealing surfaces more closely together, for a tighter sealing effect. Sealing strips 22 and 23 other than indicated above have in cross-section thickened shortshanked hook-shaped profiles similar to those of sealing strips 2 and 3, and are the sealing strips used in further embodiments described below, with various types of slider.

Figure 11:
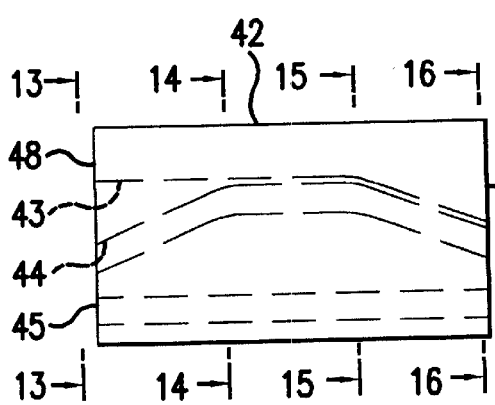
Figure 12:
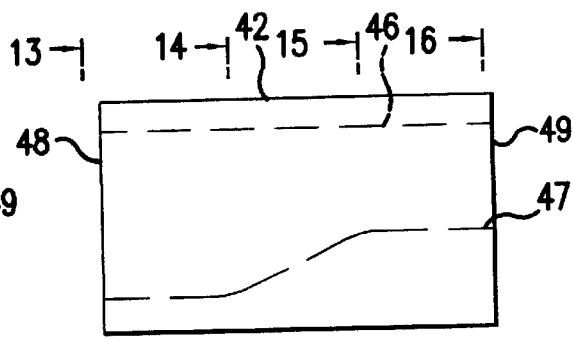
Figure 13:
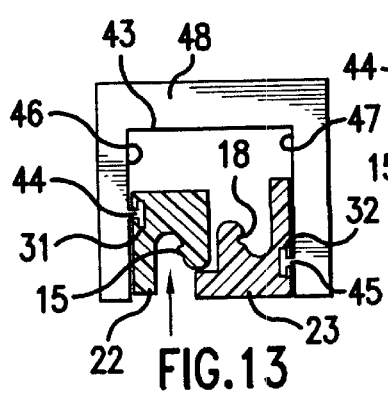
FIGS. 13–16 are taken are also shown.
Figure 14:
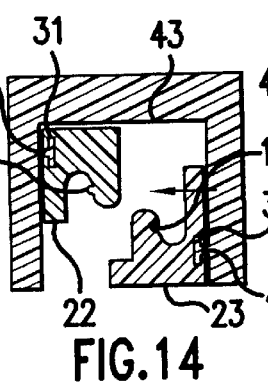
Figure 15:
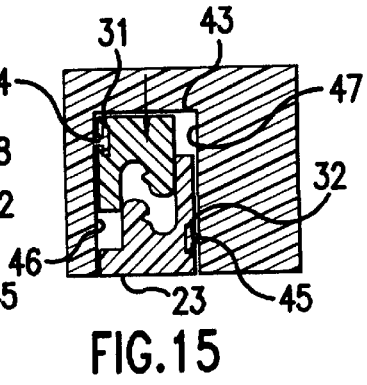

In FIGS. 1–10, two embodiments are illustrated in which the sealing strips, that is, in effect, the top edges, of the bag opening are at slightly different levels as they enter the slider to be closed and interlocked. That difference in level has no effect on the efficacy of the seal according to this invention. However, bag users are accustomed to seeing the top edges of the bag opening at the same level as they are about to be sealed, and for that reason a further embodiment of the present invention is shown in FIGS. 11–16. In this embodiment an initial vertical movement of sealing strip 22 is necessary to raise it above sealing strip 23, so that sealing strip 23 can be moved horizontally to bring it beneath sealing strip 22 so that sealing strip 22 can be moved vertically down to form interlocked fluid-tight sealing contact with sealing strip 23. Alternative slider 42, which in this embodiment straddles sealing strips 22 and 23, identical to the sealing strips in the previous embodiment of FIG. 5, in the same manner as is shown for slider 26 in FIG. 5 is shown in elevation view in FIG. 11 and in plan view in FIG. 12. In FIG. 11 element 43 is the ceiling, that is, the uppermost interior surface, of slider 42, 44 is a T-shaped rail on vertical interior wall 46 shown end-view in FIG. 13 and in cross-section in FIGS. 14–17, and 45 is a T-shaped rail on vertical interior wall 47, also shown end-view in FIG. 13 and in cross-section in FIGS. 14, 15, 16 and 17. Rail 45 runs through the interior of slider 42 parallel to the axis of slider 42 at a level required by the position of groove 32 in sealing strip 23. Rail 44 runs from a position at left hand end 48 of slider 42 set by the position of groove 31 in sealing strip 22 when also at the left hand end 48 of slider 42. Rail 44 then slopes upward to where sealing strip 22 is in sliding contact with ceiling 43 of slider 42 at the section line of FIG. 14, continues at that level, that is, parallel to the axis of slider 42 and then to its initial level as it reaches right hand end 49 of slider 42. FIG. 12 is a plan view of slider 42, showing its planar interior walls 46 and 47. Wall 46 runs parallel to the axis of slider 42. Wall 47 from left hand end 48 of slider 42 runs parallel to the axis of slider 42, and then approaches wall 46 in a modified S-curve, and then runs again parallel to the axis of slider 42 until right hand end 49. As slider 42 is moved in the leftwards bag sealing direction, the above-described configurations of the walls 46 and 47 and rails 44 and 45 move sealing strip 22 from its initial position, shown in FIG. 13 on the same level at sealing strip 23 up to its position shown in FIG. 14, then to its position shown in FIG. 15 over sealing strip 23, and then down into its position shown in FIG. 16, that is, down into sealing contact with sealing strip 23, thus overcoming the impossibility of moving the hook-shaped profiles of sealing strips 22 and 23 horizontally into sealing contact in the manner of the largely ineffective, at least with respect to fluid-tightness, horizontally interlocked seals available hitherto. As can be seen from FIG. 16, the slider internal configurations shown in FIGS. 11 and 12 have resulted in sealing strips 22 and 23 being snap-fitted together with the aid as before of ridge 15 and channel 18 into vertical interlocked fluid-tight sealing contact.

Figure 16:
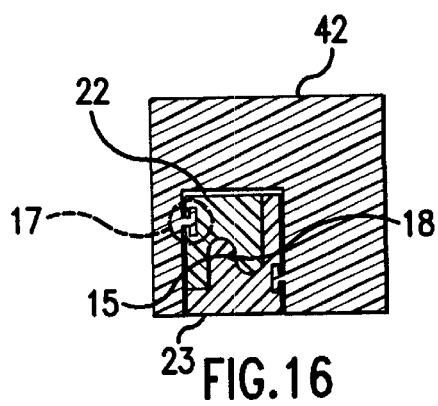
Figure 17:
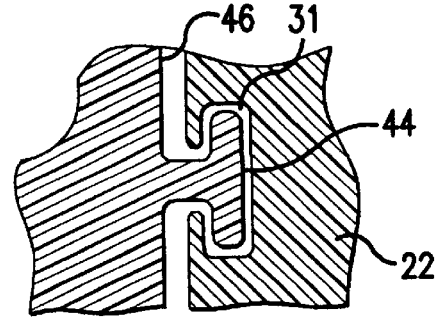
FIG. 17 is an enlarged view of the left-hand rail and groove of FIG. 16.

FIG. 17, taken from FIG. 16, is an enlarged view showing more clearly detail of the T-shaped rail 44, as an example, as attached to wall 46, and running in groove 31 in sealing strip 22.

Figure 18:
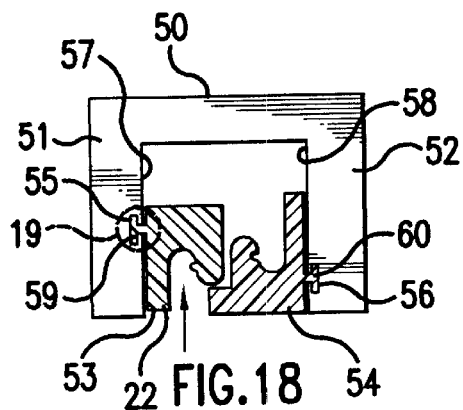
FIG. 18 is a similar view to that of FIG. 13, but showing the slider and sealing strips modified to accommodate a rail and groove reversed in position, and showing whence the enlarged view of FIG. 19 is taken.
Figure 19:
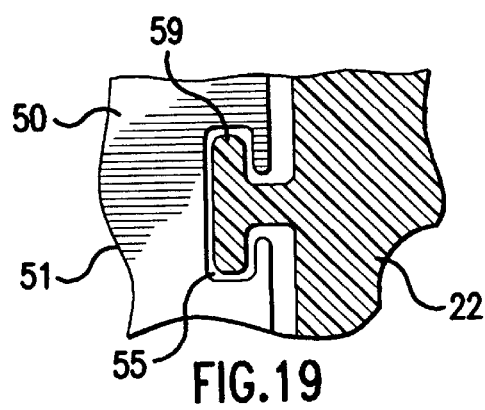
FIG. 19 is an enlarged view of the left-hand rail and groove of FIG. 18.

FIG. 18 shows an alternative arrangement of T-shaped rails and grooves of this invention, in which T-shaped grooves 55 and 56 are set into the wall surfaces 57 and 58 respectively of slider 50, and the corresponding T-shaped rails 59 and 60 are attached to sealing strips 53 and 54 respectively, which are identical in their sealing surfaces to sealing strips to sealing strips 22 and 23 respectively. In order to accommodate the T-shaped grooves in the side members 51 and 52 of slider 50, said side members are shown thicker than the corresponding parts of slider 42, for example. FIG. 19 is an enlarged view taken from FIG. 18 to show more clearly the alternative T-shaped rails and grooves. In addition to the designs of the rails and grooves particularly illustrated in FIGS. 17 and 19, other designs are possible within the cope and spirit of this invention. For example, the T-shape may be replaced by that of an upper-case L, rotated anti-clockwise through 90 degrees, so that its shorter portion is vertical, in order to support the sealing strip.

Comparative ease of molding or extruding the slider and sealing strip may determine the rail and groove profile to be chosen, as long as the sealing strip support function is achieved.

A yet further embodiment of the present invention, in which the sealing strips are at the same level as they are approached by the slider for closing, is shown in FIGS. 20–26. Alternative slider 62, which, in this embodiment straddles sealing strips 22 and 23, identical to the sealing strips in the previous embodiment of FIG. 5, in the same manner as is shown for slider 26 in FIG. 5 is shown in elevation view in FIG. 20 and in plan view in FIG. 21. In FIG. 20 element 63 is the ceiling, that is, the uppermost interior surface, of slider 62, 64 is a T-shaped rail on vertical interior wall 66 shown end-view in FIG. 22 and in cross-section in FIGS. 23–26, 65 is a T-shaped rail on vertical interior wall 67, also shown end-view in FIG. 22 and in cross-section in FIGS. 23–26. Internal ceiling 63 of slider 62 rises from its starting point near left hand end 69 of slider 62, in order for sealing strip 22 to be raised over sealing strip 23, then runs parallel to the axis of slider 62, then falls, and then runs parallel to the axis of slider 62 until right hand end 70 of slider 62 is reached at a level permitting the sealing contact of sealing strips 22 and 23 as shown in FIG. 26. Rail 64 runs from near left hand 69 of slider 62, starting at a position to fit in groove 31 in sealing strip 22 when sealing strip 22 is in contact with ceiling 63 at left hand end 69 and then runs parallel with ceiling 63 until right hand end 70 of slider 62 is reached. Rail 65 running in groove 32 of sealing strip 23 falls from its starting point near left hand end 69 of slider 62, in order for sealing strip 23 to be lowered under sealing strip 22, then runs parallel to the axis of slider 62, then rises, and then runs parallel to the axis of slider 62 until right hand end 70 of slider 62 is reached at a level permitting the interlocked sealing contact of sealing strips 22 and 23 as shown in FIG. 26.

FIG. 21 is a plan view in which internal vertical wall surfaces 66 and 67 of slider 62 are indicated by broken lines. Wall 66 starts at left hand end 69 at a position capable of accommodating the widths of sealing strips 22 and 23 and divider 68, runs parallel to the axis of slider 62, then runs inwards, and then runs parallel to the axis of slider 62 until right hand end 70 of slider 62 is reached. Wall 67 also starts at left hand end 69 at a position capable of accommodating the widths of sealing strips 22 and 23 and divider 68, runs parallel to the axis of slider 62, then runs inwards, and then runs parallel to the axis of slider 62 until right hand end 70 of slider 62 is reached. The space between walls 66 and 67 at right hand end 70 of slider 62 is that of the combined cross-sectional widths of sealing strips 22 and 23 in the interlocked sealing position shown in FIG. 26. In FIG. 22 divider 68 is of triangular transverse section intended to ease the passage of sealing strips 22 and 23 into, for closing the bag, and out of, for opening the bag, left hand end 69 of slider 62. Divider 68 is located off-center at end 69 of slider 62, to accommodate extension 37 of sealing strip 23 as shown in FIG. 8. FIGS. 22–25 show the stages of ceiling 63, rails 64 and 65 and walls 66 and 67 moving sealing strips 22 and 23 into the position shown in FIG. 26, where the slider internal configurations shown in FIGS. 20 and 21 have resulted in sealing strips 22 and 23 being snap-fitted together with the aid as before of ridge 15 and channel 18. That is, FIG. 22 shows sealing strips 22 and 23 at the entrance end 69 of slider 62, separated by divider 68; FIG. 23 shows sealing strip 22 raised, while sealing strip 23 has been moved downwards, by rails 64 and 65 respectively; FIG. 24 shows said sealing strips having been moved horizontally, 22 over 23, by the respective walls; FIG. 25 shows sealing strip 22 lowered while 23 has been raised by their respective rails just to the position where ridge 15 and channel 18 are about to snap-fit sealing strips 22 and 23 together; and FIG. 26 shows sealing strips 22 and 23 snap-fitted together into vertical interlocked fluid-tight sealing contact, the object of this invention.

Since the sealing strips of this invention are of flexible material and they and the sliders described above have low-friction surfaces, and in practice the movements of the sealing strips within the sliders, for example as shown in FIGS. 8 and 9, 13 and 14, and 22 and 23, are small, no binding of sealing strips in the slider interiors is anticipated. Although, for illustrative purposes, the sealing strip cross-sections and sliders and their movements appear large, in practice, in the case of the sealing strip cross-sectional profiles, the amount of vertical movement of the profiles is approximately ¼ the height of the profile in order to clear each other and close one over the other. If the profile's height were to be as large as ½ inch, the required vertical movement would be only ⅛ inches (or less in FIGS. 22 and 23 since both sealing strips move). For this reason also, no binding of sealing strips in the slider interiors is anticipated.

This invention in all its embodiments is easily distinguishable from Ausnit (U.S. Pat. No. 6,185,796) entitled "Vacuum Seal Reclosable Zipper", which teaches a manually operated interlocking seal with an internal hinged sealing element that provides increased resistance to forces from the bag's interior which tend to open the seal. Contrary to the present invention, where the greater the pressure differences across the seal, that is, from the bag interior to the exterior or the reverse, the tighter is the fluid-tightness of the seal, Ausnit teaches a fixed amount of extra resistance to excess internal pressure, no matter how great the excess. In addition, Ausnit teaches a horizontal seal that may have different sealing strip profiles from others hitherto available, but does not teach why the Ausnit profiles should be more able than the others to retain a vacuum, whereas the present invention has as its object a vertical seal that tightens when the pressure across it, or the vacuum on either side of it, is increased. The manual operation taught by Ausnit is also subject to the variation of finger pressure applied, whereas the present invention comprises a slider that imparts a constant, positive interlocking pressure as it travels in closing direction along its vertically interlocking sealing strips.

While several embodiments have been described above, each embodiment is directed to bringing the bag-sealing strips respectively described into the vertical bi-directional pressure resistant interlocked fluid-tight sealing contact which is a particularly novel and useful feature of this present invention. All further embodiments that achieve that novel feature lie within the scope of the present invention as described herein and claimed in the appended claims.

I claim:

1. A reusable bi-directional fluid-tight vertical sealing device for closing, sealing, and permitting re-opening of, bags, particularly bags of the type having an interior flexible space and an exterior and being essentially made of two identical sheets of flexible material joined in fluid-tight fashion together along their perimeters, except for a section of said perimeters left unjoined, said section of perimeter being straight, and forming an opening allowing access to the interior of the bag, "vertical" herein meaning in the plane of interior contact of the sheets of the bag when empty and hanging vertically, said sealing device comprising:

a first flexible sealing strip of low surface friction material having a smoothly finished internal sealing contact surface, and an external vertical substantially planar surface both of a length equal to, and with the external surface arranged in fluid-tight fashion along, the unjoined portion of the perimeter of one of the sheets, said internal sealing surface being along the first sealing strip's whole length, facing across said opening, and having an interlockable shape;

a second flexible sealing strip of low surface friction material, of a length equal to the first sealing strip's length, having a smoothly finished internal sealing contact surface, and an external vertical substantially planar surface both of a length equal to, and with the external surface arranged in fluid-tight fashion along, the unjoined portion of the perimeter of the other sheet, the internal sealing surface of said second sealing strip being along the second sealing strip's whole length, facing across said opening, and having an interlockable shape capable of being moved vertically into fully interlocked surface contact with the interlockable shape of the first sealing strip;

A slider made of rigid material of low surface friction, having a sliding-directional axis, first and second vertical internal walls adjacent to the first and second sealing strips respectively, a first end having an opening for receiving the sealing strips uninterlocked and a second end having an opening providing an exit for the sealing strips when interlocked, the slider having an inverted U-type shape for straddling said sealing strips and for sliding along and interlocking and uninterlocking said sealing strips, and having an internal reversible means of moving the sealing strips vertically toward each other into vertical interlocked fluid-tight sealing contact as said sealing strips move through the slider from the first slider end to the second slider end, and of uninterlocking said sealing strips by reverse movement of the slider;

Means arranged on each of the external vertical substantially planar surfaces of the sealing strips of interacting with the slider's internal means of moving the sealing strips into vertical interlocked fluid-tight sealing contact, and of uninterlocking said sealing strips when the direction of the slider is reversed; and A snap-fitting means arranged on said sealing strips for retaining said sealing strips in vertical interlocked fluid-tight sealing contact after said sealing strips, having moved through the slider, leave the second slider end, said snap-fitting means being reversible by reverse movement of the slider.

2. A reusable bi-directional fluid-tight vertical sealing device as claimed in claim 1, in which the slider's first end for receiving the sealing strips is of such a size and shape that as the sealing strips enter the first end of the slider the second sealing strip is vertically below and in line with the first sealing strip.

3. A reusable bi-directional fluid-tight vertical sealing device as claimed in claim 2 in which the sealing strips' means of interacting with the slider's internal reversible means of moving the sealing strips into vertical interlocked fluid-tight sealing contact is a straight axially-directed groove running along the whole length of the vertical external surface of each sealing strip.

4. A reusable bi-directional fluid-tight vertical sealing device as claimed in claim 3, in which the slider's internal reversible means of moving the sealing strips into vertical interlocked fluid-tight sealing contact comprises:

a first rail running parallel to the axis of the slider, from the first to the second end of the slider along and protruding from the first vertical internal wall, said rail being substantially of the same cross-sectional size as, and arranged to run in the axially directed groove of the first sealing strip;

a second rail running from the first to the second end of the slider along and protruding from the second vertical internal wall, said second rail being substantially of the same cross-sectional size as, and arranged to run in, the axially directed groove of the second sealing strip, and so arranged on said second wall as to move the second sealing strip, having moved through the slider from the slider's first end towards the slider's second end, vertically into contact with the first sealing strip to the extent that the internal sealing surfaces of the sealing strips are placed in vertical interlocked fluid-tight contact, and on reversal of the slider's movement to move said sealing strips apart for opening the bag.

5. A reusable bi-directional fluid-tight vertical sealing device as claimed in claim 4, in which the reversible snap-fitting means arranged on said sealing strips for retaining said sealing strips in vertical interlocked fluid-tight sealing contact after said sealing strips travel through the slider and leave the second slider end, comprises an interior curve-profiled ridge so disposed on the first sealing strip as to snap-fit into an interior channel shaped to fit said ridge, said snap-fitting occurring when the internal sealing surfaces of the first and second sealing strips are placed in vertical interlocked fluid-tight contact, and being reversed when said sealing strips are parted by reverse sliding of the slider.

6. A reusable bi-directional fluid-tight vertical sealing device as claimed in claim 1, in which the slider's first end for receiving the sealing strips is of such as size and shape that as the sealing strips enter the first end of the slider the second sealing strip is below and separated horizontally and vertically from the first sealing strip.

7. A reusable bi-directional fluid-tight vertical sealing device, as claimed in claim 6, in which the interlockable shape of the first sealing strip comprises:

a smoothly finished internal sealing contact surface, an external horizontal planar top surface, and an external vertical substantially planar surface both of a length equal to, and with the external vertical surface arranged in fluid-tight fashion along, the unjoined portion of the perimeter of one of the sheets, said internal sealing surface being along the whole length of the first sealing strip, facing across said opening, and being shaped in transverse cross-section as a thickened, short-shanked hook, having an interior curve-profiled ridge, said hook shape curving in a direction toward the interior space of the bag, having in turn a lower horizontal sealing surface, and said external vertical surface having along the whole length of the first sealing strip a straight axially-directed groove; and the interlockable shape of the second sealing strip comprises:

a smoothly finished internal sealing contact surface, an external horizontal planar lower surface, and an external vertical substantially planar surface both of a length equal to, and with the external vertical surface arranged in fluid-tight fashion along, the unjoined portion of the perimeter of the other sheet, the internal sealing surface of said second sealing strip being along the whole length of the second sealing strip, facing across said opening, and being shaped in transverse cross-section as a short-shanked hook of a size and shape having an interior channel shaped to fit the interior curve-profiled ridge of the first sealing strip and capable of achieving fully interlocked surface contact with the hook shape of the sealing surface of the first sealing strip, said hook shape of the second sealing strip curving in a direction away from the interior space of the bag, a portion of said external horizontal planar lower surface extending beyond the curving of the hook shape and forming an extension of the hook shape, having in turn an upper horizontal sealing surface, the hook shank of the first sealing strip, when fully interlocked sealing contact is achieved, being in sealing contact with the horizontal, upper, sealing surface of the extended portion of the hook shape of the second sealing strip, and said external vertical surface of the second sealing strip having along the whole length of the second sealing strip a straight axially-directed groove.

8. A reusable bi-directional fluid-tight vertical sealing device, as claimed in claim 6, in which, in which the slider's internal reversible means of moving the sealing strips into vertical interlocked fluid-tight sealing contact comprises:

first and second vertical internal walls adjacent to the first and second sealing strips respectively and extending from the first to the second end of the slider, the second vertical internal wall being directed from the first end of the slider at an angle toward the first sealing strip so as to push the second sealing strip horizontally to a position vertically below the first sealing strip, said wall then being directed parallel to the axis of the slider until said second vertical internal wall terminates at the second end of the slider;

a first rail running from the first to the second end of the slider along and protruding from the first vertical internal slider wall, said first rail being substantially of the same cross-sectional size as, and arranged to run in, the axially directed groove of the first sealing strip, said first rail being so arranged on said first vertical internal wall as initially to maintain the first sealing strip parallel to the axis of the slider, when moving through the slider from the slider's first end towards the slider's second end, until the second vertical internal wall has moved the second sealing strip vertically under said first sealing strip, and then to move the first sealing strip downwards towards sealing contact with the second sealing strip;

a second rail running from the first to the second end of the slider along and protruding from the second vertical internal slider wall, said second rail being substantially of the same cross-sectional size as, and arranged to run in, the axially directed groove of the second sealing strip, said second rail being so arranged on said wall as initially to maintain the second sealing strip parallel to the axis of the slider, when moving through the slider from the slider's first end towards the slider's second end, until the second vertical internal wall has moved the second sealing strip vertically under said first sealing strip, and then to move the second sealing strip upwards towards sealing contact with the first sealing strip until the sealing surfaces on both sealing strips are in full vertical interlocked fluid-tight sealing contact, and also causing the ridge of the first sealing strip to snap-fit into the channel of the second sealing strip for holding the sealing strips in vertical interlocked fluid-tight sealing contact after passing through the slider from the first to the second slider end.

9. A reusable bi-directional fluid-tight vertical sealing device as claimed in claim 1, in which the slider's first end for receiving the sealing strips is of such a size and shape that as the sealing strips enter the first end of the slider the first and second sealing strips are at the same horizontal level.

10. A reusable bi-directional fluid-tight vertical sealing device, as claimed in claim 9, in which the interlockable shape of the first sealing strip comprises:

a smoothly finished internal sealing contact surface, an external horizontal planar top surface, and an external vertical substantially planar surface both of a length equal to, and with the external vertical surface arranged in fluid-tight fashion along, the unjoined portion of the perimeter of one of the sheets, said internal sealing surface being along the whole length of the first sealing strip, facing across said opening, and being shaped in transverse cross-section as a thickened, short-shanked hook, having an interior curve-profiled ridge, said hook shape curving in a direction toward the interior space of the bag, and having in turn a lower horizontal sealing surface, and said external vertical surface having along the whole length of the first sealing strip a straight axially-directed groove; and the interlockable shape of the second sealing strip comprises:

a smoothly finished internal sealing contact surface, an external horizontal planar lower surface, and an external vertical substantially planar surface both of a length equal to, and with the external vertical surface arranged in fluid-tight fashion along, the unjoined portion of the perimeter of the other sheet, the internal sealing surface of said second sealing strip being along the whole length of the second sealing strip, facing across said opening, and being shaped in transverse cross-section as a short-shanked hook of a size and shape having an interior channel shaped to fit the interior curve-profiled ridge of the first sealing strip and capable of achieving fully interlocked surface contact with the hook shape of the sealing surface of the first sealing strip, said hook shape of the second sealing strip curving in a direction away from the interior space of the bag, a portion of said external horizontal planar lower surface extending beyond the curving of the hook shape and forming an extension of the hook shape, having in turn an upper horizontal sealing surface, the hook shank of the first sealing strip, when fully interlocked sealing contact is achieved, being in sealing contact with the horizontal, upper, sealing surface of the extended portion of the hook shape of the second sealing strip, and said external vertical surface of the second sealing strip having along the whole length a straight axially-directed groove.

11. A reusable bi-directional fluid-tight vertical sealing device, as claimed in claim 9, in which the slider's internal reversible means of moving the sealing strips into vertical interlocked fluid-tight sealing contact comprises:

an internal ceiling, having a length the same as that of the slider, running from the first to the second end of the slider initially in a horizontal plane, then sloping at an angle downwards toward said second end for assisting in guiding the first sealing strip into sealing contact with the second sealing strip;

a first rail running from the first to the second end of the slider along and protruding from the first vertical internal wall, said first rail being substantially of the same cross-sectional size as, and arranged to run in, the axially directed groove of the first sealing strip, said first rail being so arranged on said first vertical internal wall as initially to raise the first sealing strip when moving through the slider from the slider's first end towards the slider's second end, until the first sealing strip is at a level above the second sealing strip, then to maintain the first sealing strip parallel to the axis of the slider, then to lower the first sealing strip in contact with the slider's ceiling for meeting the second sealing strip in vertical interlockable fluid-tight sealing contact;

first and second vertical internal walls adjacent to the first and second sealing strips respectively and extending from the first to the second end of the slider, the first vertical internal wall being parallel to the axis of the slider, and the second vertical internal wall being directed initially parallel to the axis of the slider from the first end of the slider, then at an angle toward the first vertical internal wall so as to move the second sealing strip horizontally to a position vertically below and in line with the first sealing strip, said second vertical internal wall then being directed parallel to the axis of the slider until said second vertical internal wall terminates at the second end of the slider, the first vertical internal wall being maintained in contact with external vertical surface of the first sealing strip throughout the length of the slider in a vertical plane parallel to the axis of the slider; and a second rail running parallel to the axis of the slider from the first to the second end of the slider along and protruding from the second vertical internal wall, said second rail being substantially of the same cross-sectional size as, and arranged to run in, the axially directed groove of the second sealing strip, said second rail being so arranged on said wall as initially to maintain the second sealing strip parallel to the axis of the slider, when moving through the slider from the slider's first end towards the slider's second end, so that the first sealing strip descends onto the second sealing strip until the sealing surfaces on both sealing strips are in full vertical interlocked fluid-tight sealing contact, causing the ridge of the first sealing strip to snap-fit into the channel of the second sealing strip for holding the sealing strips in vertical interlocked fluid-tight sealing contact after passing through the slider from the first to the second slider end.

12. A reusable bi-directional fluid-tight vertical sealing device, as claimed in claim 9, in which the slider's internal reversible means of moving the sealing strips into vertical interlocked fluid-tight sealing contact comprises:

first and second internal vertical walls adjacent to the first and second sealing strips respectively;

a divider, of triangular transverse section with its apex toward the second end of the slider, arranged on the first end of the slider between the first and second sealing strips as said sealing strips enter the slider, for easing the passage of said sealing strips into the slider for closing the bag, and, in reverse, for easing said sealing strips out of the first end of the slider for opening the bag;

an internal ceiling, having a length the same as that of the slider, starting from the first end of the slider in a horizontal plane, and then sloping at an angle upwards and then running parallel to the axis of the slider, then sloping down, and then running in a horizontal plane until the second end of the slider, for assisting in guiding the first sealing strip into sealing contact with the second sealing strip;

a first rail running from the first to the second end of the slider along and protruding from the first internal vertical wall, said rail being substantially of the same cross-sectional size as, and arranged to run in, the axially directed groove of the first sealing strip, said first rail being so arranged on said wall parallel to the ceiling, for moving the first sealing strip to meet the second sealing strip in vertical interlockable fluid-tight sealing contact;

the first and second vertical internal walls extending from the first to the second end of the slider, both internal vertical walls starting, at a distance apart allowing for the divider and for the sealing strips at entry to the first end of the slider, parallel to each other and to the axis of the slider, the first vertical internal wall then at an angle toward the second internal vertical wall so as to move the first sealing strip horizontally to a position vertically above and in line with the second sealing strip, the second vertical internal wall then running at an angle toward the first vertical internal wall so as to move the second sealing strip horizontally into a position vertically below and in line with the first sealing strip, and thence both vertical internal walls running parallel to each other until the second end of the slider; and a second rail running from the first to the second end of the slider along and protruding from the second vertical internal wall, said rail being substantially of the same cross-sectional size as, and arranged to run in, the axially directed groove of the second sealing strip, said second rail being so arranged on said second vertical internal wall as to run initially from the first to the second end of the slider in a horizontal plane, so as to lower the second sealing strip when moving through the slider from the slider's first end towards the slider's second end, until the second sealing strip is at a level below the first sealing strip, then maintain the second sealing strip parallel to the axis of the slider, then to raise the second sealing strip, and then running in a horizontal plane, for meeting the first sealing strip in vertical interlockable fluid-tight sealing contact until the sealing surfaces on both sealing strips are in full vertical interlocked fluid-tight sealing contact, causing the ridge of the first sealing strip to snap-fit into the channel of the second sealing strip for holding the sealing strips in vertical interlocked fluid-tight sealing contact after passing through the slider from the first to the second slider end.

13. A reusable bi-directional fluid-tight vertical sealing device for closing, sealing, and permitting re-opening of, bags, particularly bags of the type having an interior flexible space and an exterior and being essentially made of two identical sheets of flexible material joined in fluid-tight fashion together along their perimeters, except for a section of said perimeters left unjoined, said section of perimeter being straight, and forming an opening allowing access to the interior of the bag, "vertical" herein meaning in the plane of interior contact of the sheets of the bag when empty and hanging vertically, said sealing device comprising:

a first flexible sealing strip of low surface friction material having a smoothly finished internal sealing contact surface, an external horizontal planar top surface, and an external vertical substantially planar surface both of a length equal to, and with the external surface arranged in fluid-tight fashion along, the unjoined portion of the perimeter of one of the sheets, said internal sealing surface being along the first sealing strip's whole length, facing across said opening, and being shaped in transverse cross-section as a thickened, short-shanked hook, having an interior curve-profiled ridge, said hook shape curving in a direction toward the interior space of the bag, a portion of said external horizontal planar surface extending beyond the curving of the hook shape and forming an extension of the hook shape, having in turn a lower horizontal sealing surface, and said external vertical surface having along the first sealing strip's whole length a straight axially-directed groove;

a second flexible sealing strip of low surface friction material having a smoothly finished internal sealing contact surface, an external vertical substantially planar surface both of a length equal to, and with the external surface arranged in fluid-tight fashion along, the unjoined portion of the perimeter of the other sheet, the internal sealing surface of said second sealing strip being along the second sealing strip's whole length, facing across said opening, and being shaped in transverse cross-section as a short-shanked hook of a size and shape having an interior channel shaped to fit the interior curve-profiled ridge of the first sealing strip and capable of achieving vertical interlocked surface contact with the hook shape of the sealing surface of the first sealing strip, said hook shank then being in sealing contact with the horizontal, lower, sealing surface of the extended portion of the hook shape of the first sealing strip, said hook shape of the second sealing strip curving in a direction away from the interior space of the bag, and said external vertical surface of the second sealing strip having along the second sealing strip's whole length a straight axially-directed groove; and A slider made of rigid material of low surface friction, having a sliding-directional axis, first and second vertical internal walls adjacent to the first and second sealing strips respectively, a first end for receiving the sealing strips uninterlocked and a second end providing an exit for the sealing strips interlocked, an inverted U-type shape for straddling said sealing strips and for sliding along and interlocking and uninterlocking said sealing strips, the first end for receiving the sealing strips uninterlocked with the second sealing strip positioned vertically below and in line with the first sealing strip, the first vertical internal wall being for sliding axially along the first sealing strip with an axial-directed rail protruding from the first vertical internal wall positioned so as to slide in the groove of the first sealing strip and the second vertical internal wall being for sliding axially along the second sealing strip with a rail protruding from the second vertical internal wall positioned so as to slide in the groove of the second sealing strip and sloping in a smooth modified S-curve upwards from the first to the second end of the slider, said slider being arranged on and around the exteriors of, and for sliding along, the first and second sealing strips in initial un-interlocked condition for moving by action of the rails of the slider in the respective grooves of the sealing strips the sealing surfaces of said hook-shaped sealing strips into a mutually interlocked vertical fluid-tight sealing contact, and also causing the ridge of the first sealing strip to snap-fit into the channel of the second sealing strip for holding the sealing strips in vertical interlocked fluid-tight sealing contact after passing through the slider from the first to the second slider end thereby sealing the bag against all pressure differences between the bag's interior and exterior.

14. A reusable bi-directional fluid-tight vertical sealing device for closing, sealing, and permitting re-opening of, bags, particularly bags of the type having an interior flexible space and an exterior and being essentially made of two identical sheets of flexible material joined in fluid-tight fashion together along their perimeters, except for a section of said perimeters left unjoined, said section of perimeter being straight, and forming an opening allowing access to the interior of the bag, "vertical" herein meaning in the plane of interior contact of the sheets of the bag when empty and hanging vertically, said sealing device comprising:

a first sealing strip having a smoothly finished internal sealing contact surface, an external horizontal planar top surface, and an external vertical substantially planar surface both of a length equal to, and with the external vertical surface arranged in fluid-tight fashion along, the unjoined portion of the perimeter of one of the sheets, said internal sealing surface being along the whole length of the first sealing strip, facing across said opening, and being shaped in transverse cross-section as a thickened, short-shanked hook, having an interior curve-profiled ridge, said hook shape curving in a direction toward the interior space of the bag, having in turn a lower horizontal sealing surface, and said external vertical surface having along the whole length of the first sealing strip a straight axially-directed groove;

a second sealing strip having a smoothly finished internal sealing contact surface, an external horizontal planar lower surface, and an external vertical substantially planar surface both of a length equal to, and with the external vertical surface arranged in fluid-tight fashion along, the unjoined portion of the perimeter of the other sheet, the internal sealing surface of said second sealing strip being along the whole length of the second sealing strip, facing across said opening, and being shaped in transverse cross-section as a short-shanked hook of a size and shape having an interior channel shaped to fit the interior curve-profiled ridge of the first sealing strip and capable of achieving fully interlocked surface contact with the hook shape of the sealing surface of the first sealing strip, said hook shape of the second sealing strip curving in a direction away from the interior space of the bag, a portion of said external horizontal planar lower surface extending beyond the curving of the hook shape and forming an extension of the hook shape, having in turn an upper horizontal sealing surface, the hook shank of the first sealing strip, when fully interlocked sealing contact is achieved, being in sealing contact with the horizontal, upper, sealing surface of the extended portion of the hook shape of the second sealing strip, and said external vertical surface of the second sealing strip having along the whole length of the second sealing strip a straight axially-directed groove; and a slider made of rigid material of low surface friction, having a sliding-directional axis, first and second vertical internal walls adjacent to the first and second sealing strips respectively, a first end for receiving the sealing strips uninterlocked with the second sealing strip positioned below and separated horizontally and vertically from the first sealing strip, and a second end providing an exit for the sealing strips interlocked, an inverted U-type shape for straddling said sealing strips and for sliding along and interlocking and uninterlocking said sealing strips, and having first and second vertical internal walls adjacent to the first and second sealing strips respectively and extending from the first to the second end of the slider, the first vertical internal wall being parallel to the axis of the slider and the second vertical internal wall of the slider being directed from the first end of the slider at angle toward the first sealing strip so as to push the second sealing strip horizontally to a position vertically below the first sealing strip, said wall then being directed parallel to the axis of the slider until said wall terminates at the second end of the slider;

a first rail running from the first to the second end of the slider along and protruding from the first vertical internal slider wall, said first rail being substantially of the same cross-sectional size as, and arranged to run in, the axially directed groove of the first sealing strip, said first rail being so arranged on said first vertical internal wall as initially to maintain the first sealing strip parallel to the axis of the slider, when moving through the slider from the slider's first end towards the slider's second end, until the second vertical internal wall of the slider has moved the second sealing strip vertically under said first sealing strip, and then to move the first sealing strip downwards towards sealing contact with the second sealing strip; and a second rail running from the first to the second end of the slider along and protruding from the second vertical internal wall, said second rail being substantially of the same cross-sectional size as, arranged to run in the axially directed groove of the second sealing strip, said second rail being so arranged on said wall as initially to maintain the second sealing strip parallel to the sliding of the slider, when moving through the slider from the slider's first end towards the slider's second end, until the second vertical internal wall has moved the second sealing strip under said first sealing strip, and then to move the second sealing strip upwards towards sealing contact with the first sealing strip until the sealing surfaces on both sealing strips are in full vertical interlocked fluid-tight sealing contact, and also causing the ridge of the first sealing strip to snap-fit into the channel of the second sealing strip for holding the sealing strips in vertical interlocked fluid-tight sealing contact after passing through the slider from the first to the second slider end.

15. A reusable bi-directional fluid-tight vertical sealing device as claimed in claim 14, in which the rails are T-shaped and run in T-shaped grooves.

16. A reusable bi-directional fluid-tight vertical sealing device for closing, sealing, and permitting re-opening of, bags, particularly bags of the type having an interior flexible space and an exterior and being essentially made of two identical sheets of flexible material joined in fluid-tight fashion together along their perimeters, except for a section of said perimeters left unjoined, said section of perimeter being straight, and forming an opening allowing access to the interior of the bag, "vertical" herein meaning in the plane of interior contact of the sheets of the bag when empty and hanging vertically, said sealing device comprising:

a first sealing strip having a smoothly finished internal sealing contact surface, an external horizontal planar top surface, and an external vertical substantially planar surface both of a length equal to, and with the external vertical surface arranged in fluid-tight fashion along, the unjoined portion of the perimeter of one of the sheets, said internal sealing surface being along the whole length of the first sealing strip, facing across said opening, and being shaped in transverse cross-section as a thickened, short-shanked hook, having an interior curve-profiled ridge, said hook shape curving in a direction toward the interior space of the bag, and having in turn a lower horizontal sealing surface, and said external vertical surface having along the whole length of the first sealing strip a straight axially-directed groove;

a second sealing strip having a smoothly finished internal sealing contact surface, an external horizontal planar lower surface, and an external vertical substantially planar surface both of a length equal to, and with the external vertical surface arranged in fluid-tight fashion along, the unjoined portion of the perimeter of the other sheet, the internal sealing surface of said second sealing strip being along the whole length of the second sealing strip, facing across said opening, and being shaped in transverse cross-section as a short-shanked hook of a size and shape having an interior channel shaped to fit the interior curve-profiled ridge of the first sealing strip and capable of achieving fully interlocked surface contact with the hook shape of the sealing surface of the first sealing strip, said hook shape of the second sealing strip curving in a direction away from the interior space of the bag, a portion of said external horizontal planar lower surface extending beyond the curving of the hook shape and forming an extension of the hook shape, having in turn an upper horizontal sealing surface, the hook shank of the first sealing strip, when fully interlocked sealing contact is achieved, being in sealing contact with the horizontal, upper, sealing surface of the extended portion of the hook shape of the second sealing strip, and said external vertical surface of the second sealing strip having along the whole length of the second sealing strip a straight axially-directed groove; and a slider made of rigid material of low surface friction, having a sliding-directional axis, first and second vertical internal walls adjacent to the first and second sealing strips respectively, a first end for receiving the sealing strips uninterlocked and being of such a size and shape that as the sealing strips enter the first end of the slider the first and second sealing strips are at the same horizontal level, and a second end providing an exit for the sealing strips interlocked, an inverted U-type shape for straddling said sealing strips and for sliding along and interlocking and uninterlocking said sealing strips, and first and second vertical internal vertical walls adjacent to the first and second sealing strips respectively and extending from the first to the second end of the slider, and further comprising:

an internal ceiling, having a length the same as that of the slider, running from the first to the second end of the slider initially in a horizontal plane, then sloping at an angle downwards to said second end for assisting in guiding the first sealing strip into sealing contact with the second sealing strip;

a first rail running from the first to the second end of the slider along and protruding from the first vertical internal wall, said first rail being substantially of the same cross-sectional size as, and arranged to run in, the axially directed groove of the first sealing strip, said first rail being so arranged on said first vertical internal wall as initially to raise the first sealing strip when moving through the slider from the slider's first end towards the slider's second end, until the first sealing strip is at a level above the second sealing strip, then maintain the first sealing strip parallel to the axis of the slider, then to lower the first sealing strip in contact with the slider's ceiling for meeting the second sealing strip in vertical interlockable fluid-tight sealing contact;

first and second vertical internal walls adjacent to the first and second sealing strips respectively and extending from the first to the second end of the slider, the second vertical internal wall being directed from the first end of the slider initially at angle toward the first vertical internal wall so as to move the second sealing strip horizontally to a position vertically below and in line with the first sealing, said second vertical internal wall then being directed parallel to the axis of the slider until said wall terminates at the second end of the slider, the first vertical internal wall adjacent to the first sealing strip being maintained in contact with the external vertical surface of the first sealing strip throughout the length of the slider in a vertical plane parallel to the axis of the slider; and a second rail running from the first to the second end of the slider along and protruding from the second vertical internal wall, said rail being substantially of the same cross-sectional size as, and arranged to run in the axially directed groove of, the second sealing strip, said second rail being so arranged on said second vertical internal wall as initially to maintain the second sealing strip parallel to the axis of the slider, when moving through the slider from the slider's first end towards the slider's second end, so that the first sealing strip descends onto the second sealing strip until the sealing surfaces on both sealing strips are in full vertical interlocked fluid-tight sealing contact, causing the ridge of the first sealing strip to snap-fit into the channel of the second sealing strip for holding the sealing strips in vertical interlocked fluid-tight sealing contact after passing through the slider from the first to the second slider end.

17. A reusable bi-directional fluid-tight vertical sealing device as claimed in claim 16, in which the rails and grooves are T-shaped and the T-shaped rails run in the T-shaped grooves.

18. A reusable bi-directional fluid-tight vertical sealing device for closing, sealing, and permitting re-opening of, bags, particularly bags of the type having an interior flexible space and an exterior and being essentially made of two identical sheets of flexible material joined in fluid-tight fashion together along their perimeters, except for a section of said perimeters left unjoined, said section of perimeter being straight, and forming an opening allowing access to the interior of the bag, "vertical" herein meaning in the plane of interior contact of the sheets of the bag when empty and hanging vertically, said sealing device comprising:

a first sealing strip having a smoothly finished internal sealing contact surface, an external horizontal planar top surface, and an external vertical substantially planar surface both of a length equal to, and with the external vertical surface arranged in fluid-tight fashion along, the unjoined portion of the perimeter of one of the sheets, said internal sealing surface being along the whole length of the first sealing strip, facing across said opening, and being shaped in transverse cross-section as a thickened, short-shanked hook, having an interior curve-profiled ridge, said hook shape curving in a direction toward the interior space of the bag, having in turn a lower horizontal sealing surface, and said external vertical surface having along the whole length of the first sealing strip a straight axially-directed groove;

a second sealing strip having a smoothly finished internal sealing contact surface, an external horizontal planar lower surface, and an external vertical substantially planar surface both of a length equal to, and with the external vertical surface arranged in fluid-tight fashion along, the unjoined portion of the perimeter of the other sheet, the internal sealing surface of said second sealing strip being along the whole length of the second sealing strip, facing across said opening, and being shaped in transverse cross-section as a short-shanked hook of a size and shape having an interior channel shaped to fit the interior curve-profiled ridge of the first sealing strip and capable of achieving fully interlocked surface contact with the hook shape of the sealing surface of the first sealing strip, said hook shape of the second sealing strip curving in a direction away from the interior space of the bag, a portion of said external horizontal planar lower surface extending beyond the curving of the hook shape and forming an extension of the hook shape, having in turn an upper horizontal sealing surface, the hook shank of the first sealing strip, when fully interlocked sealing contact is achieved, being in sealing contact with the horizontal, upper, sealing surface of the extended portion of the hook shape of the second sealing strip, and said external vertical surface of the second sealing strip having along the whole length of said second sealing strip a straight axially-directed groove; and a slider made of rigid material of low surface friction, having a sliding-directional axis, first and second vertical internal walls adjacent to the first and second sealing strips respectively and extending from the first to the second end of the slider, a first end for receiving the sealing strips uninterlocked and being of such a size and shape that as the sealing strips enter the first end of the slider the first and second sealing strips are at the same horizontal level, and a second end providing an exit for the sealing strips interlocked, in an inverted U-type shape for straddling said sealing strips and for sliding along and interlocking and uninterlocking said sealing strips, and further comprising:

a divider of triangular transverse section with its apex toward the second end of the slider arranged on the first end of the slider between the first and second sealing strips as said sealing strips enter the slider, for easing the passage of said sealing strips into the slider for closing the bag, and, in reverse for easing said sealing strips out of the first end of the slider, for opening the bag;

an internal ceiling, having a length the same as that of the slider, starting from the end of the slider in a horizontal plane, and then sloping at an angle upwards and then running parallel to the axis of the slider, then sloping down, and then running in a horizontal plane until the second end of the slider, for assisting in guiding the first sealing strip into sealing contact with the second sealing strip; and a first rail running from the first to the second end of the slider along and protruding from the first internal vertical wall, said rail being substantially of the same cross-sectional size as, and arranged to run in, the axially directed groove of the first sealing strip, said first rail being so arranged on said wall parallel to the ceiling, for moving the first sealing strip to meet the second sealing strip in vertical interlockable fluid-tight sealing contact;

the first and second vertical internal walls extending from the first to the second end of the slider, both internal vertical walls starting, at a distance apart allowing for the divider and for the sealing strips at entry to the first end of the slider, parallel to each other and to the axis of the slider, the first vertical internal wall then at an angle toward the second internal vertical wall so as to move the first sealing strip horizontally to a position vertically above and in line with the second sealing strip, the second vertical internal wall then running at an angle toward the first vertical internal wall so as move the second sealing strip horizontally to a position vertically below and in line with the first sealing strip, and thence both vertical internal walls running parallel to each other until the second end of the slider;

a second rail running from the first to the second end of the slider along and protruding from the second vertical internal wall, said rail being substantially of the same cross-sectional size as, and arranged to run in, the axially directed groove of the second sealing strip, said second rail being so arranged on said second vertical internal wall as to run initially from the first to the second end of the slider in a horizontal plane, to lower the second sealing strip when moving through the slider from the slider's first end towards the slider's second end, until the second sealing strip is at a level below the first sealing strip, then maintain the second sealing strip parallel to the axis of the slider, then to raise the second sealing strip, and then running in a horizontal plane, for meeting the first sealing strip in vertical interlockable fluid-tight sealing contact until the sealing surfaces on both sealing strips are in full vertical interlocked fluid-tight sealing contact, causing the ridge of the first sealing strip to snap-fit into the channel of the second sealing strip for holding the sealing strips in vertical interlocked fluid-tight sealing contact after passing through the slider from the first to the second slider end.

19. A reusable bi-directional fluid-tight vertical sealing device as claimed in claim 18, in which the rails and grooves are T-shaped and the T-shaped rails run in the T-shaped grooves.

20. A reusable bi-directional, fluid-tight, vertical sealing device for closing, sealing, and permitting re-opening of, bags, particularly bags of the type having an interior flexible space and an exterior and being essentially made of two identical sheets of flexible material joined in fluid-tight fashion together along their perimeters, except for a section of said perimeters left unjoined, said section of perimeter being straight, and forming an opening allowing access to the interior of the bag, "vertical" herein meaning in the plane of interior contact of the sheets of the bag when empty and hanging vertically, said sealing device comprising:

a first sealing strip having a smoothly finished internal sealing contact surface, an external horizontal planar top surface, and an external vertical substantially planar surface both of a length equal to, and with the external vertical surface arranged in fluid-tight fashion along, the unjoined portion of the perimeter of one of the sheets, said internal sealing surface being along the whole length of the first sealing strip, facing across said opening, and being shaped in transverse cross-section as a thickened, short-shanked hook, having an interior curve-profiled ridge, said hook shape curving in a direction toward the interior space of the bag, having in turn a lower horizontal sealing surface, and said external vertical surface having along the whole length of the first sealing strip a straight axially-directed rail;

a second sealing strip having a smoothly finished internal sealing contact surface, an external horizontal planar lower surface, and an external vertical substantially planar surface both of a length equal to, and with the external vertical surface arranged in fluid-tight fashion along, the unjoined portion of the perimeter of the other sheet, the internal sealing surface of said second sealing strip being along the whole length of the second sealing strip, facing across said opening, and being shaped in transverse cross-section as a short-shanked hook of a size and shape having an interior channel shaped to fit the interior curve-profiled ridge of the first sealing strip and capable of achieving fully interlocked surface contact with the hook shape of the sealing surface of the first sealing strip, said hook shape of the second sealing strip curving in a direction away from the interior space of the bag, a portion of said external horizontal planar lower surface extending beyond the curving of the hook shape and forming an extension of the hook shape, having in turn an upper horizontal sealing surface, the hook shank of the first sealing strip, when fully interlocked sealing contact is achieved, being in sealing contact with the horizontal, upper, sealing surface of the extended portion of the hook shape of the second sealing strip, and said external vertical surface of the second sealing strip having along the whole length of said second sealing strip a straight axially-directed rail; and a slider made of rigid material of low surface friction, having a sliding-directional axis, first and second vertical internal walls adjacent to the first and second sealing strips respectively and extending from the first to the second end of the slider, a first end for receiving the sealing strips uninterlocked and being of such a size and shape that as the sealing strips enter the first end of the slider the first and second sealing strips are at the same horizontal level, and a second end providing an exit for the sealing strips interlocked, an inverted U-type shape for straddling said sealing strips and for sliding along and interlocking and uninterlocking said sealing strips, and further comprising:

a divider of triangular transverse section with its apex toward the second end of the slider arranged on the first end of the slider between the first and second sealing strips as said sealing strips enter the slider, for easing the passage of said sealing strips into the slider for closing the bag, and, in reverse for easing said sealing strips out of the first end of the slider, for opening the bag; and an internal ceiling, having a length the same as that of the slider, running from the first to the second end of the slider in a horizontal plane, and then sloping at an angle upwards and then running parallel to the axis of the slider, then sloping down, and then running in a horizontal plane until the second end of the slider, for assisting in guiding the first sealing strip into sealing contact with the second sealing strip;

the first wall having a groove running from the first to the second end of the slider along, said groove being substantially of the same cross-sectional size as, and arranged to carry, the axially directed rail of the first sealing strip, said first wall groove being so arranged on said first wall parallel to the ceiling, for moving the first sealing strip to meet the second sealing strip in vertical interlockable fluid-tight sealing contact;

the first and second vertical internal walls running, at a distance apart allowing for the divider and for the sealing strips at entry to the first end of the slider, parallel to each other and to the axis of the slider, the first internal vertical wall then running at an angle toward the second internal vertical wall so as to move the first sealing strip horizontally to a position vertically above and in line with the second sealing strip, the second internal vertical wall then running at an angle toward the first internal vertical wall so as to move the second sealing strip horizontally to a position vertically below and in line with the first sealing strip, and thence both vertical internal walls running parallel to each other until the second end of the slider;

the second vertical internal wall having a groove running from the first to the second end of the slider, said groove being substantially of the same cross-sectional size as, and arranged to carry, the axially directed rail of the second sealing strip, said second wall groove being so arranged on said wall as to start from the first end of the slider in a horizontal plane, to lower the second sealing strip when moving through the slider from the slider's first end towards the slider's second end, until the second sealing strip is at a level below the first sealing strip, then to maintain the second sealing strip parallel to the axis of the slider, then to raise the second sealing strip, and then running in a horizontal plane until the second end of the slider, for moving the second sealing strip to meet the first sealing strip in vertical interlockable fluid-tight sealing contact until the sealing surfaces on both sealing strips are in full vertical interlocked fluid-tight sealing contact, causing the ridge of the first sealing strip to snap-fit into the channel of the second sealing strip for holding the sealing strips in vertical interlocked fluid-tight sealing contact after passing through the slider from the first to the second slider end.

21. A reusable bi-directional fluid-tight vertical sealing device as claimed in claim 20, in which the rails and grooves are T-shaped and the T-shaped rails run in the T-shaped grooves.

* * * * *